(12) United States Patent
Sun et al.

(10) Patent No.: US 9,432,100 B2
(45) Date of Patent: Aug. 30, 2016

(54) EFFICIENT SEARCH OF PRECODERS IN PRECODED MIMO SYSTEMS

(71) Applicant: Marvell World Trade Ltd., St. Michael (BB)

(72) Inventors: Yakun Sun, Sunnyvale, CA (US); Mingguang Xu, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/018,807

(22) Filed: Sep. 5, 2013

(65) Prior Publication Data

US 2014/0064393 A1 Mar. 6, 2014

Related U.S. Application Data

(60) Provisional application No. 61/697,442, filed on Sep. 6, 2012.

(51) Int. Cl.
*H04L 25/49* (2006.01)
*H04B 7/04* (2006.01)
*H04B 7/02* (2006.01)

(52) U.S. Cl.
CPC .......... *H04B 7/0456* (2013.01); *H04B 7/0478* (2013.01)

(58) Field of Classification Search
CPC  H04B 7/0639; H04B 7/0417; H04B 7/0456; H04B 7/0478; H04L 25/03343
USPC .................................................. 375/267, 296
See application file for complete search history.

(56) References Cited

U.S. PATENT DOCUMENTS

| 7,599,332 | B2 | 10/2009 | Zelst et al. |
| 7,742,390 | B2 | 6/2010 | Mujtaba |
| 8,259,835 | B2 | 9/2012 | Kim |
| 8,270,909 | B2 | 9/2012 | Zhang et al. |
| 8,289,869 | B2 | 10/2012 | Sawai |

(Continued)

FOREIGN PATENT DOCUMENTS

| EP | 2 557 721 | 2/2013 |
| WO | WO 2011/137595 | 11/2011 |
| WO | WO 2011/137740 | 11/2011 |

OTHER PUBLICATIONS

International Search Report and Written Opinion for International Application No. PCT/US2013/058155, mailed Nov. 18, 2013.

(Continued)

*Primary Examiner* — David S Huang

(57) ABSTRACT

A method includes calculating a set of first metrics using channel information and one or more precoders, where each of the first metrics corresponds to a respective set of a plurality of sets of codebook precoders, and selecting, based on the set of first metrics and a first selection criteria, a set of codebook precoders from the plurality of sets of codebook precoders. The method also includes, in response to selecting the set of codebook precoders, calculating a set of second metrics and selecting, based on (i) the set of second metrics and (ii) a second selection criteria, a codebook precoder from the selected set of codebook precoders. Each of the second metrics is calculated using a respective codebook precoder in the selected set of codebook precoders. The method also includes causing the selected codebook precoder to be applied to a signal to be transmitted to a communication device.

23 Claims, 5 Drawing Sheets

(56) References Cited

U.S. PATENT DOCUMENTS

| | | |
|---|---|---|
| 8,619,907 B2 | 12/2013 | Mujtaba et al. |
| 2009/0080549 A1 | 3/2009 | Khan et al. |
| 2012/0039196 A1 | 2/2012 | Zhang |
| 2012/0328031 A1* | 12/2012 | Pajukoski et al. ............ 375/259 |
| 2013/0121439 A1* | 5/2013 | Zhu et al. .................... 375/296 |

OTHER PUBLICATIONS

3GPP TR 36.816 V11.2.0, "3rd Generation Partnership Project; Technical Specification Group Radio Access Network; Evolved Universal Terrestrial Radio Access (E-UTRA); Study on Signaling and Procedure for Interference Avoidance for In-Device Coexistence (Release 11)", 44 pages (Dec. 2011).

3GPP TS 36.212 V10.5.0, "3rd Generation Partnership Project; Technical Specification Group Radio Access Network; Evolved Universal Terrestrial Radio Access (E-UTRA); Multiplexing and channel coding (Release 10)", 79 pages (Mar. 2012).

3GPP TS 36.213 V10.5.0, 3rd Generation Partnership Project; Technical Specification Group Radio Access Network; Evolved Universal Terrestrial Radio Access (E-UTRA); Physical Layer Procedures (Release 10), 125 pages (Mar. 2012).

3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 194 pages (Mar. 2012).

IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Ansari, et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Perahia, et al., "Gigabit Wireless LANs: an overview of IEEE 802.11ac and 802.11ad," ACM SIGMOBILE Mobile Computing and Communications Review, vol. 15, No. 3, pp. 23-33 (Jul. 2011).

"Technical White Paper: Long Term Evolution (LTE): A Technical Overview", Motorola, 15 pages (2007).

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", Dec. 2011, 101 pages.

3GPP TS 36.213 V10.4.0, 3rd Generation Partnership Project; Technical Specification Group Radio Access Network; Evolved Universal Terrestrial Radio Access (E-UTRA); Physical Layer Procedures (Release 10), Dec. 2011, 125 pages.

Love et al., "An Overview of Limited Feedback in Wireless Communication Systems," IEEE J. on Selected Areas in Communications, vo. 26, No. 8, Oct. 2008.

International Preliminary Report on Patentability in International Application No. PCT/US2013/058155, mailed Mar. 19, 2015 (5 pages).

\* cited by examiner

EFFICIENT SEARCH OF PRECODERS IN PRECODED MIMO SYSTEMS

CROSS-REFERENCES TO RELATED APPLICATIONS

This claims the benefit of U.S. Provisional Patent Application No. 61/697,442, entitled "Methods for Efficient Search of Precoders in Precoded MIMO Systems" and filed on Sep. 6, 2012, the disclosure of which is hereby incorporated herein by reference.

FIELD OF THE DISCLOSURE

The present disclosure relates generally to wireless communication systems and, more particularly, to precoding in multiple-input, multiple-output (MIMO) systems.

BACKGROUND

In multiple-input, multiple-output (MIMO) wireless communication systems, throughput, spectral efficiency, and link reliability are increased by utilizing multiple transmit and receive antennas to provide a number of independent spatial channels. MIMO is commonly used to improve performance in orthogonal frequency division multiplexing (OFDM) wireless communication systems, such as Third Generation Partnership Project (3GPP) Long Term Evolution (LTE) systems, 3GPP WiMAX systems, IEEE 802.11n systems, and IEEE 802.11ac systems, for example. Generally, MIMO transmitter devices (e.g., 3GPP LTE eNodeB devices, WiMAX NodeB devices, IEEE 802.11n or 802.11ac access points, etc.) apply a precoder to signals that are to be transmitted in order to improve signal quality at the intended receiver, and to reduce interference to other, unintended receivers.

Typically, multiple different precoders are included in a "codebook," and the MIMO system selects a particular precoder from the codebook so that the selected precoder may be applied to signals transmitted by a transmitting device. The precoder is generally selected based on measured channel state information (CSI), and is selected such that some system performance metric(s) is/are optimized. Generally, larger codebooks with more precoders are more likely to include a precoder that closely matches (i.e. counteracts) the measured propagation effects of the channel. By accurately counteracting the propagation effects of the channel, system throughput may be improved. As the codebook size increases, however, the search for an appropriate precoder can incur additional computational complexity and/or a longer search time.

SUMMARY

In an embodiment, a method is implementable by one or more processors in a communication system that includes a first communication device configured to receive precoded signals from a second communication device via a wireless channel. The method includes calculating, via the one or more processors, a set of first metrics using (i) channel information corresponding to the wireless channel, and (ii) one or more precoders. Each metric of the set of first metrics corresponds to a respective set of a plurality of sets of codebook precoders. The method also includes selecting, via the one or more processors and based on (i) the set of first metrics and (ii) a first selection criteria, a set of codebook precoders from the plurality of sets of codebook precoders.

The method also includes, in response to selecting the set of codebook precoders, calculating, via the one or more processors, a set of second metrics and selecting, via the one or more processors and based on (i) the set of second metrics and (ii) a second selection criteria, a codebook precoder from the selected set of codebook precoders. Calculating a set of second metrics includes calculating each metric in the set of second metrics using a respective codebook precoder in the selected set of codebook precoders. The method also includes causing, via the one or more processors, the selected codebook precoder to be applied to a signal to be transmitted from the second communication device to the first communication device.

The above embodiment, and various embodiments described below, may provide one or more advantages. For example, a reduced number of precoders may need to be evaluated as compared to conventional techniques, thereby saving time and/or computational power. Further, a system designer may be provided with considerable flexibility as compared to conventional techniques (e.g., the ability to trade off performance and computational efficiency).

DETAILED DESCRIPTION

In embodiments described below, a wireless multiple-input, multiple-output (MIMO) communication system utilizes an efficient technique for searching a codebook to select an appropriate precoder. Conceptually, the technique involves arranging the precoders of the codebook in a decision tree with multiple levels/decision points. In one embodiment, for example, decision-making begins at a root node, with one of multiple child nodes being selected at each level of the decision tree until a "leaf node" (i.e. node with no child nodes) is reached. Each leaf node represents a different precoder of the codebook (referred to herein as a "codebook precoder"), in an embodiment, with the different codebook precoders/leaf nodes being grouped (i.e., assigned a common parent node) according to a particular rule or algorithm, and/or according to a pre-existing structure of the codebook or other suitable heuristic. In an embodiment, each parent node for a group of codebook precoders is itself represented by at least one precoder, which can be used to evaluate whether that particular parent node should be selected. In one embodiment, each parent node is associated with a precoder that is the same as one of the codebook precoders associated with the leaf nodes that stem from that parent node (e.g., the codebook precoder that best "represents" those particular leaf nodes). In other embodiments, each parent node is instead associated with a precoder that is derived from all of the codebook precoders associated with the leaf nodes that stem from that parent node (e.g., the precoder is set equal to a spatial centroid of all codebook precoders corresponding to those particular leaf nodes, in one embodiment). In some embodiments, the decision tree has more than two levels/decision points that are traversed when selecting a codebook precoder. In one embodiment, for example, the parent nodes of the leaf nodes are themselves grouped according to a rule, algorithm or heuristic, with each group being assigned to a different "grandparent" node.

Figure 1:
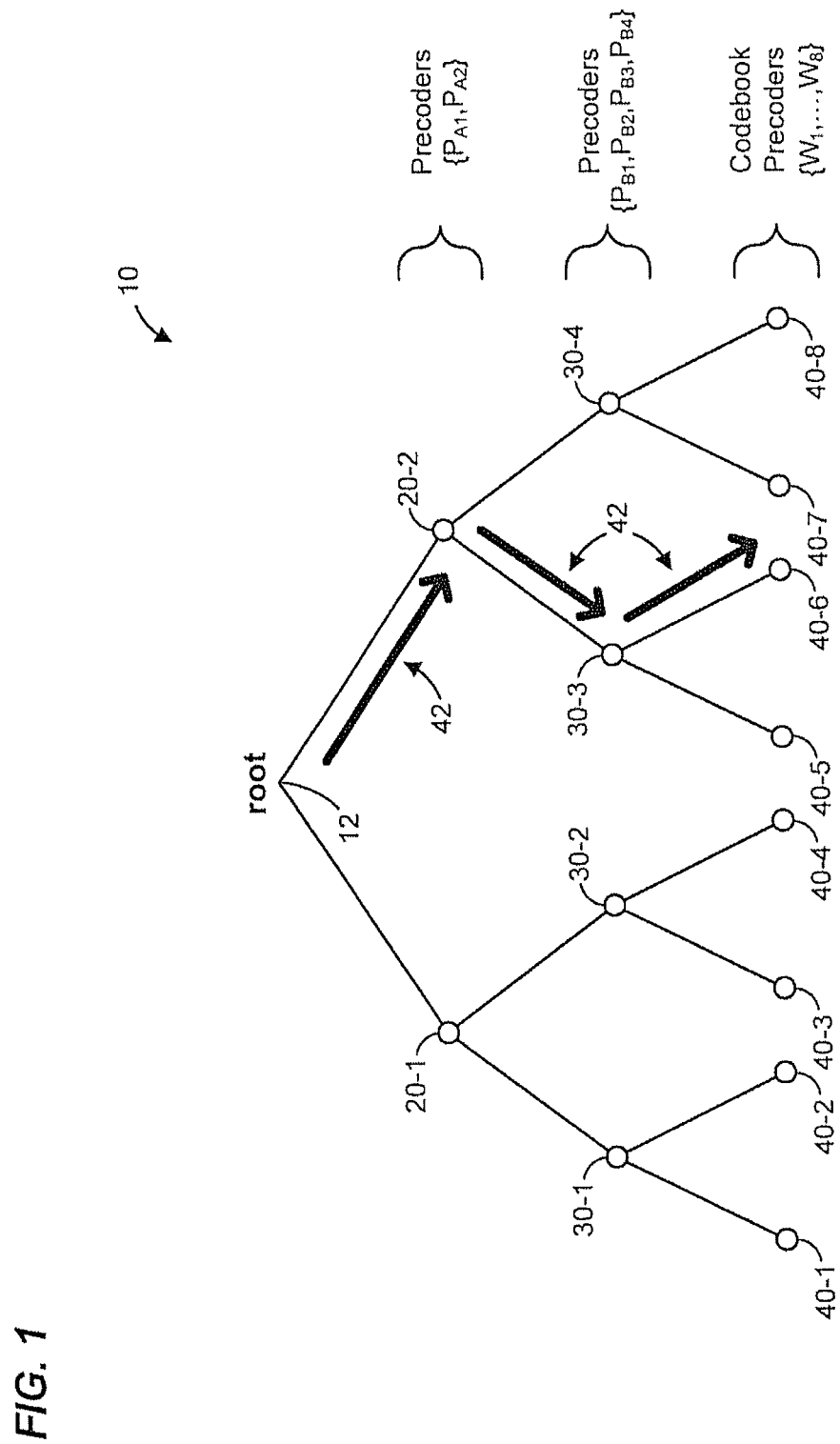
FIG. 1 is a diagram of an example decision tree utilized to efficiently search for a precoder in a codebook, according to an embodiment.

FIG. 1 is a diagram of an example decision tree 10 utilized to efficiently search for a precoder in a codebook, according to an embodiment. In the example decision tree 10, a root node 12 represents the starting point for the precoder search. The root node 12 is connected to child nodes 20-1 and 20-2. Nodes 20-1 and 20-2 each also serve as a parent node for the next level/generation in the decision tree 10. Specifically, node 20-1 is a parent to child nodes 30-1 and 30-2, and node 20-2 is a parent to child nodes 30-3 and 30-4. Further, each of nodes 30-1 through 30-4 serves as a parent node for the final level/generation (i.e., the leaf nodes 40) in the decision tree 10. In particular, node 30-1 is a parent to leaf nodes 40-1 and 40-2, node 30-2 is a parent to leaf nodes 40-3 and 40-4, node 30-3 is a parent to leaf nodes 40-5 and 40-6, and node 30-4 is a parent to leaf nodes 40-7 and 40-8. At times, nodes 20 and/or nodes 30 may be referred to herein as "intermediate nodes" because those nodes are neither root nodes nor leaf nodes (i.e., because those nodes have both a parent node and child nodes).

In the example embodiment of FIG. 1, each of the leaf nodes 40-1 through 40-8 is associated with a single precoder in a codebook that includes precoders $W_1$, $W_2$, $W_3$, $W_4$, $W_5$, $W_6$, $W_7$ and $W_8$ (i.e., leaf node 40-1 is associated with precoder $W_1$, leaf node 40-2 is associated with precoder $W_2$, etc.). To select one of the precoders $\{W_1, \ldots, W_8\}$ from the codebook, in an embodiment, one child node is selected at each level, starting from root node 12, until one of leaf nodes 40-1 through 40-8 is reached, at which point the precoder associated with the selected leaf node 40 becomes the selected precoder, and is ultimately applied to a transmission signal. One example decision path is shown by the arrows 42, which corresponds to a scenario in which node 20-2 is selected after nodes 20-1 and 20-2 have been evaluated, node 30-3 is selected after nodes 30-3 and 30-4 have been evaluated, and then leaf node 40-6 (corresponding to codebook precoder $W_6$) is selected after leaf nodes 40-5 and 40-6 have been evaluated.

Generally, in an embodiment, the decision at each level of the decision tree 10 is made by evaluating all child nodes based on suitable metrics (e.g., signal-to-interference-plus-noise ratio (SINR), throughput, capacity, etc.), and selecting the "best" node based on desired metrics (e.g., the node that provides a highest SINR, highest throughput, etc.). At the final decision level, the remaining candidate nodes among leaf nodes 40 are evaluated using the codebook precoders $W_1$ that are associated with those nodes. In order to allow the suitable metrics to also be calculated at the various intermediate nodes in the decision path, in an embodiment, each of the intermediate nodes (i.e., each of nodes 20-1 and 20-2, and each of nodes 30-1 through 30-4), is also associated with a respective precoder, or a respective set of precoders. In particular, in the example embodiment of FIG. 1, each node j (for j=1 or 2) of intermediate nodes 20 is associated with a different precoder (or set of precoders) $P_{Aj}$, and each node k (for k=1, 2 3, or 4) of nodes 30 is associated with a different precoder (or set of precoders) $P_{Bk}$. While $P_{Aj}$ and $P_{Bk}$ are referred to hereafter simply as "precoders" (for ease of explanation), it is understood that each $P_{Aj}$ and/or each $P_{Bk}$ instead represents, and/or depends on the performance of (based on suitable metrics such as signal-to-interference-plus-noise ratio (SINR), throughput, capacity, etc.), a set of two or more precoders in some embodiments.

Each of the precoders $P_{Bk}$ for nodes 30-1 through 30-4 is in some way representative of, and/or depends on, a subset of the codebook precoders $W_1$. In particular, each of the precoders $P_{Bk}$ is representative of, and/or depends on, those codebook precoders that are associated with leaf nodes 40 connected as child nodes. In some embodiments, for example, precoder $P_{B1}$ (associated with node 30-1) is equal to one of, or a function of one or both of, the codebook precoders $W_1$ and $W_2$ (associated with leaf nodes 40-1 and 40-2, respectively), and precoder $P_{B2}$ (associated with node 30-2) is equal to one of, or a function of one or both of, the codebook precoders $W_3$ and $W_4$ (associated with leaf nodes 40-3 and 40-4, respectively), etc. Similarly, in an embodiment, each of the precoders $P_{Aj}$ for nodes 20-1 and 20-2 is in some way representative of, and/or depends on, the precoders associated with the respective child (intermediate) nodes 30. In some embodiments, for example, precoder $P_{A1}$ (associated with node 20-1) is equal to one of, or a function of one or both of, the precoders $P_{B1}$ and $P_{B2}$ (associated with nodes 30-1 and 30-2, respectively), and precoder $P_{A2}$ (associated with node 20-2) is equal to one of, or a function of one or both of, the precoders $P_{B3}$ and $P_{B4}$ (associated with nodes 30-3 and 30-4, respectively).

More generally, in some embodiments, precoders for parent nodes are based on precoders of the child nodes using any suitable algorithm, equation, or heuristic. In some embodiments, for example, a precoder for a parent node is determined (e.g., by a system designer) using the Lloyd algorithm, by setting the precoder equal to a spatial centroid of the child nodes, or in any other suitable manner.

The particular arrangement of codebook precoders and/or intermediate node precoders within a given decision tree (e.g., the criteria by which certain leaf nodes 40 are grouped as child nodes under a particular intermediate node 30, or the criteria by which certain intermediate nodes 30 are grouped as child nodes under a particular intermediate node 20) varies according to different embodiments. In one embodiment, for example, an iterative algorithm such as the Lloyd algorithm is used to group child nodes under a parent node. In another example embodiment, a clustering approach (e.g., based on distances between precoders associated with the child nodes) is used to group child nodes. In one embodiment, for example, clustering based on distances between entries in the codebook containing precoders $W_1$ through $W_8$ is used to group particular leaf nodes 40 under a common parent node 30. In yet another example embodiment, an existing structure of a codebook is utilized to determine the grouping of child nodes (e.g., as discussed below with reference to FIG. 4 for an example LTE Release 10 system with 8 CSI-RS antenna ports, or according to some other suitable heuristic).

Various ways in which parent node precoders may relate to child node precoders, as well as various ways in which child nodes may be grouped together under a common parent node, according to different embodiments, are discussed in more detail below with reference to FIGS. 4 and 5. Further, various ways in which metrics may be calculated based on the precoders associated with intermediate and leaf nodes, as well as various ways in which the calculated metrics may be used to select a particular child node, according to different embodiments, are also discussed in more detail below with reference to FIGS. 4 and 5.

While the example decision tree 10 of FIG. 1 has three decision levels (i.e., first to select a node 20, second to select a node 30, and third to select a node 40), other embodiments may have only two decision levels, or more than three decision levels. Moreover, in some other embodiments, the number of decision levels varies depending on system performance requirements and available computational power, and the corresponding decision path may have a different number of steps. In one alternative embodiment, for example, the decision tree 10 of FIG. 1 does not include any of nodes 40-5 through 40-8, and both of nodes 30-3 and 30-4 serve as leaf nodes. In one such embodiment, for example, nodes 40-1 through 40-4 and nodes 30-3 and 30-4 each correspond to a different precoder in a codebook with only six precoders, $W_1$ through $W_6$. Moreover, while the example decision tree 10 of FIG. 1 has two child nodes per parent node, other embodiments have more than two child nodes for some or all of the parent nodes, at some or all of the decision levels in decision tree 10. In one alternative embodiment, for example, the decision tree 10 of FIG. 1 has four nodes 30-1 through 30-4 stemming from node 20-1, four leaf nodes 40-1 through 40-4 stemming from node 30-1, six leaf nodes 40-5 through 40-10 stemming from node 30-2, etc. The search complexity is generally proportional to both the depth of the decision tree and the number of child nodes per parent node, in an embodiment, and a system designer may balance search complexity against performance by adjusting these two parameters.

By using the example decision tree 10, the selection of one of codebook precoders $W_1$ through $W_8$ may become significantly faster and more computationally efficient. For example, while a conventional precoded MIMO system can require exhaustively evaluating each of the eight codebook precoders $W_1$ through $W_8$ in order to select a "best" precoder, it can be seen from FIG. 1 that the decision tree 10 only involves evaluating precoders at six different nodes (i.e., nodes 20-1 and 20-2 at the first decision point, only two of the nodes 30-1 through 30-4 at the second decision point, and only two of the nodes 40-1 through 40-8 at the third and final decision point), in an embodiment. Thus, in at least some embodiments, the example decision tree 10 provides roughly a 25% reduction in the number of computations. Note that in other embodiments, more or less improvement may be seen. In one alternative embodiment where the decision tree 10 has six child nodes 20 of root node 12, and three nodes 40 per node 20, for example, and where nodes 40 are leaf nodes each associated with a different one of 18 codebook precoders (note that in this example there are no nodes 30), the decision tree 10 may provide roughly a 50% reduction in the number of computations (i.e., nine precoders and/or nodes are evaluated in total, as compared to evaluating all 18 codebook precoders with conventional techniques).

Figure 2:
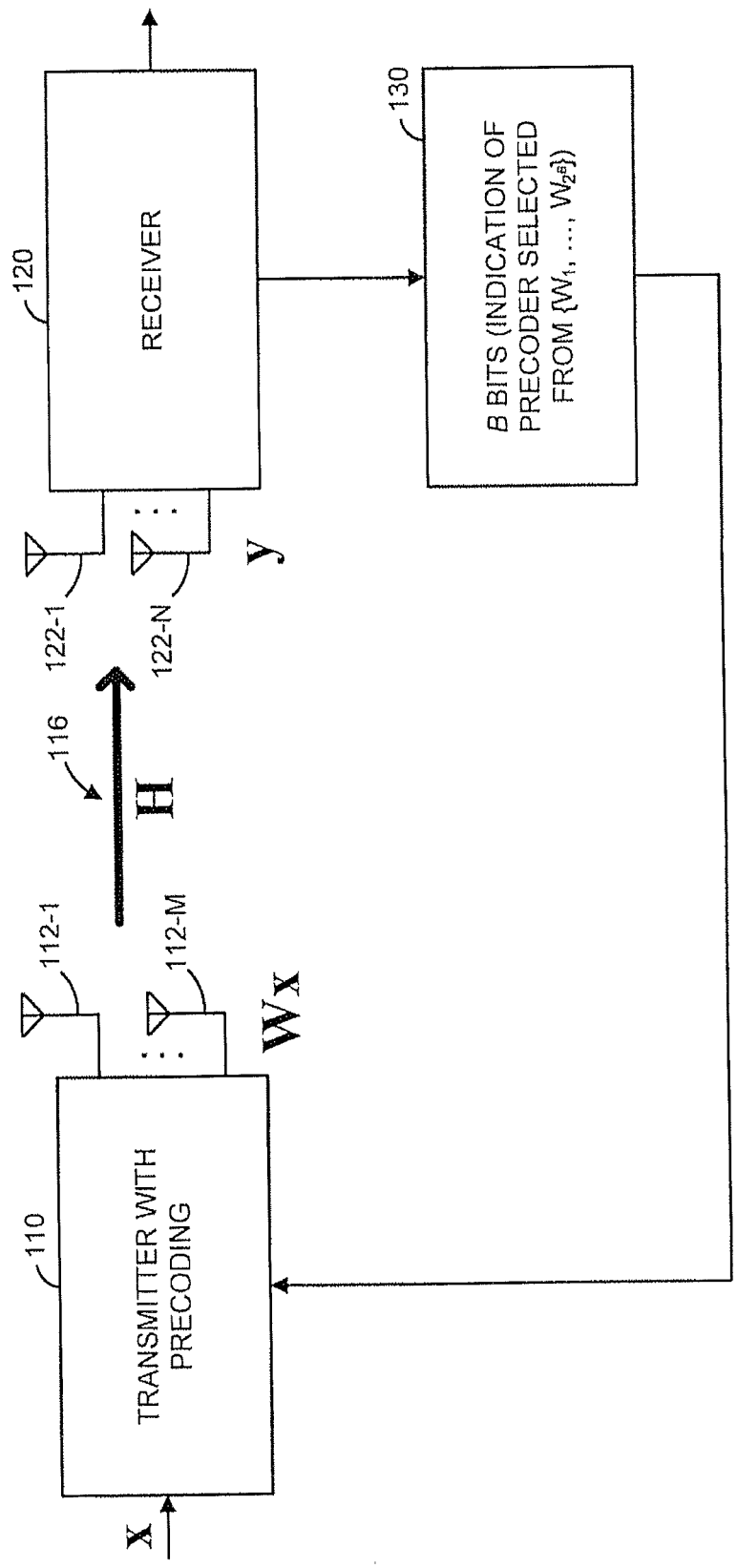
FIG. 2 is a block diagram of an example wireless MIMO communication system in which a decision tree such as the example decision tree of FIG. 1 is implemented, according to an embodiment.

FIG. 2 is a block diagram of an example wireless MIMO communication system 100 in which a decision tree such as the example decision tree 10 of FIG. 1 is implemented, according to an embodiment. In the communication system 100, a transmitter 110 with M transmit antennas 112-1 through 112-M precodes signals that are sent, via a wireless channel 116, to a receiver 120 with N receive antennas 122-1 through 122-N. In various embodiments, M is any integer greater than one and N is any integer greater than one. In some embodiments, M is greater than N. In one embodiment, for example, M=8 and N=2. In various embodiments, the transmitter 110 is a base station (e.g., a 3GPP LTE eNodeB) device, a Wi-Fi access point device, or a different suitable transmitting device, and the receiver 120 is a mobile cellular (e.g., 3GPP LTE UE) device, a Wi-Fi (e.g., IEEE 802.11n or 802.11ac) client station device, or a different suitable receiving device.

In the example communication system 100, the transmitter 110 uses a precoder W chosen from among $2^B$ different precoders $W_i$ of a codebook. Thus, in the example communication system 100 of FIG. 2, the signal y received by the receiver device 120 may be represented as:

$$y = HWx + n \qquad \text{(Equation 1)}$$

In Equation 1, H is the estimated channel matrix corresponding to the wireless channel 116, W is the precoder applied at the transmitter 110, x is the transmitted signal vector (prior to precoding), and n is the noise vector as received at the receiver 120.

In order to determine which codebook precoder W to apply to a particular signal intended for receiver 120, the transmitter 110 relies on feedback 130 from the receiver 120. To this end, in one embodiment, the transmitter 110 sends a known signal (e.g., pilots, a sounding signal, etc.) to the receiver 120 via the wireless channel 116, and the receiver estimates the channel matrix H of the wireless channel 116. The receiver 120 then utilizes the estimated channel matrix H, along with the set of codebook precoders to select the codebook precoder W to be used by the transmitter 110. In some embodiments, the receiver 120 also uses other channel information (e.g., SNR) to select one of the codebook precoders $W_i$.

As noted above, conventional systems search for the most appropriate precoder by evaluating all precoders in a codebook. For a codebook indexed by B bits, an exhaustive search of this sort causes the computational complexity to increase exponentially with B. Unlike these conventional systems, the receiver 120 utilizes a decision tree with two or more levels/decision points to select the codebook precoder W. As a result, in some embodiments, the computational complexity and/or search time is substantially reduced as compared to conventional search techniques. In one embodiment, for example, the decision tree 10 of FIG. 1 is utilized by the receiver 120 to select one of eight codebook precoders $W_1$ through $W_8$. In other embodiments, a different, suitable decision tree is utilized. As discussed above in connection with the embodiment of FIG. 1, the receiver 120 is able to make decisions at each level of the decision tree by utilizing special precoders, not necessarily included in the codebook, for each intermediate node of the decision tree, in an embodiment.

In a codebook of size (or nearly of size) $2^B$, B bits are generally used to index the precoders within the codebook. Thus, after the receiver 120 selects a precoder W from the codebook, the receiver 120 sends feedback 130 (including B bits of data representing the index corresponding to the selected precoder W) to the transmitter 110, in an embodiment. In one embodiment, the transmitter 110 also has a priori knowledge of the codebook (e.g., knowledge of which precoders are in the codebook, and knowledge of which precoders correspond to which index numbers), and is therefore able to uniquely determine the appropriate codebook precoder W based on the B bits feedback from the receiver 120. In an embodiment, the feedback 130 is sent from one or more of the antennas 122-1 through 122-N to one or more of the antennas 112-1 through 112-M via a reverse channel not shown in FIG. 2.

In alternative embodiments, the transmitter 110 determines which of the codebook precoders $W_1$ should be used in a different manner. In one embodiment, for example, the feedback 130 from the receiver 120 includes the entire selected codebook precoder W, or a compressed version of the selected codebook precoder W, and the transmitter 110 therefore need not have a priori knowledge of the codebook. In another example embodiment, the feedback 130 from the receiver 120 includes channel state information, or compressed channel state information, and the transmitter 110 uses a decision tree similar to decision tree 10 of FIG. 1 to select the codebook precoder W. In yet another example embodiment, the transmitter 110 utilizes implicit channel estimation techniques to select the precoder, and the feedback 130 is omitted. In one such embodiment, the transmitter 110 determines a channel estimate for the reverse channel based on a signal (e.g., sounding signal) received from the receiver 120, assumes that the channel estimate H of the wireless channel 116 is the same as the channel estimate for the reverse channel, and selects the codebook precoder W using a decision tree similar to decision tree 10 of FIG. 1.

Figure 3:
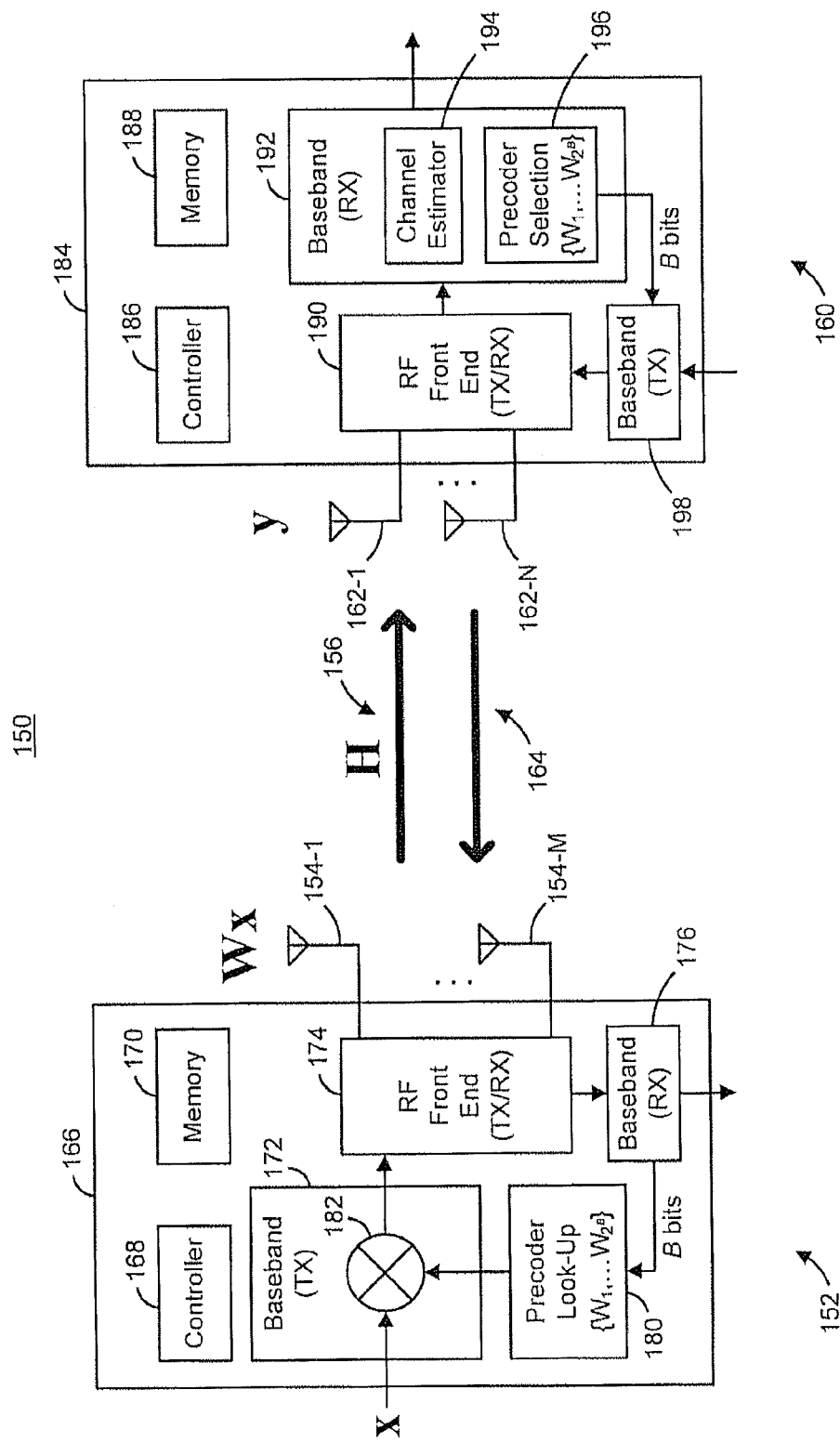
FIG. 3 is a more detailed block diagram of an example wireless MIMO communication system in which a decision tree such as the example decision tree of FIG. 1 is implemented, according to an embodiment.

FIG. 3 is a more detailed block diagram of an example wireless MIMO communication system 150 in which a decision tree such as the example decision tree 10 of FIG. 1 is implemented, according to an embodiment. In the communication system 150, a transmitter 152 includes M transmit antennas 154-1 through 154-M, and precodes signals that are sent, via a wireless channel 156, to a receiver 160 having N receive antennas 162-1 through 162-N. The example communication system 150 corresponds to an embodiment similar to communication system 100 of FIG. 2, with a reverse wireless channel 164 providing feedback similar to the feedback 130 of FIG. 2.

In the example communication system 150 of FIG. 3, the transmitter 152 includes a network interface 166 having a controller 168 and a memory 170. In an embodiment, the controller 168 comprises hardware, such as an application-specific integrated circuit (ASIC), for example. Alternatively, or additionally, in an embodiment, the controller 168 comprises one or more processors configured to execute software instructions stored in the memory 170. The memory 170 comprises volatile and/or non-volatile memory, such as random access memory (RAM) and/or read-only memory (ROM), in various embodiments. The network interface 166 also includes a transmit baseband processing unit 172 coupled to a radio frequency (RF) front end 174 that includes RF transmit circuitry (e.g., filter(s), mixer(s), power amplifier(s), etc.). The RF front end 174 is in turn coupled to the M antennas 154-1 through 154-M. The RF front end 174 also includes RF receive circuitry (e.g., filter(s), low noise amplifier(s), mixer(s), etc.), and is coupled to a receive baseband processing unit 176. In an embodiment, the receive baseband processing unit 176 detects (and also decodes) precoder feedback received from the receiver 160 (e.g., feedback similar to feedback 130 in FIG. 2), and provides an indicator of a selected codebook precoder W (e.g., a B bit index included in the feedback) to a precoder look-up unit 180. In an embodiment, the precoder look-up unit 180 determines the selected precoder W by cross-referencing the B bit index to the precoder W in a database (e.g., a database stored in memory 170). In an embodiment, the functions of the precoder look-up unit 180 are implemented by the controller 168. Once the selected precoder W has been determined, the precoder W is applied to a transmit signal by a precoding unit 182 within the baseband processor 172. The precoding unit 182 multiplies the transmit signal vector x by the selected precoder W, in an embodiment. In an embodiment, the functions of the precoding unit 182, and/or other portions of the transmit baseband processing unit 172 and/or portions of the receive baseband processing unit 176, are implemented by the controller 168.

The receiver 160 in the example communication system 150 includes a network interface 184 having a controller 186 and a memory 188. In an embodiment, the controller 186 comprises hardware, such as an ASIC, for example. Alternatively, or additionally, in an embodiment, the controller 186 comprises one or more processors configured to execute software instructions stored in the memory 188. The memory 188 comprises volatile and/or non-volatile memory, such as RAM and/or ROM, in various embodiments. The network interface 184 also includes an RF front end 190 that includes RF receive circuitry (e.g., filter(s), low noise amplifier(s), mixer(s), etc.) and is coupled to the N antennas 162-1 through 162-N. The RF front end 190 is also coupled to a receive baseband processing unit 192, which includes a channel estimator 194 and a precoder selection unit 196. The channel estimator 194 is configured to estimate the forward channel 156. In one embodiment, the channel estimator 194 estimates the forward channel 156 (e.g., determines the channel matrix H) based on sounding signals received from transmitter 152 via channel 156. In another embodiment, the channel estimator 194 estimates the forward channel 156 based on pilot signals received from transmitter 152 via channel 156.

The channel estimator 194 provides an estimate of the channel (e.g., the estimated channel matrix H) to the precoder selection unit 196, which implements a decision tree algorithm to select one of the precoders $W_1$ from a codebook of size $2^B$ (or, in some embodiments, less than size $2^B$). In one embodiment, for example, the precoder selection unit 196 selects a codebook precoder W using a decision tree, similar to decision tree 10 of FIG. 1, according to any one of the embodiments discussed above with reference to FIG. 1. The precoder selection unit 196 then provides B bits, which identify the index of the selected precoder W within the codebook, to a transmit baseband processing unit 198, in an embodiment. The transmit baseband processing unit 198 incorporates the B bits of information in a modulated signal, which is transmitted on the reverse channel 164 via the RF front end 190 (which also includes RF transmit circuitry) and one or more of the antennas 162-1 through 162-N. As noted above, the feedback signal can then be used by the precoder look-up unit 180 to determine the appropriate codebook precoder W. In an embodiment, the functions of the precoder selection unit 196, the channel estimator 194, and/or other portions of the receive baseband processing unit 192 and/or portions of the transmit baseband processing unit 198, are implemented by the controller 186.

Figure 4:
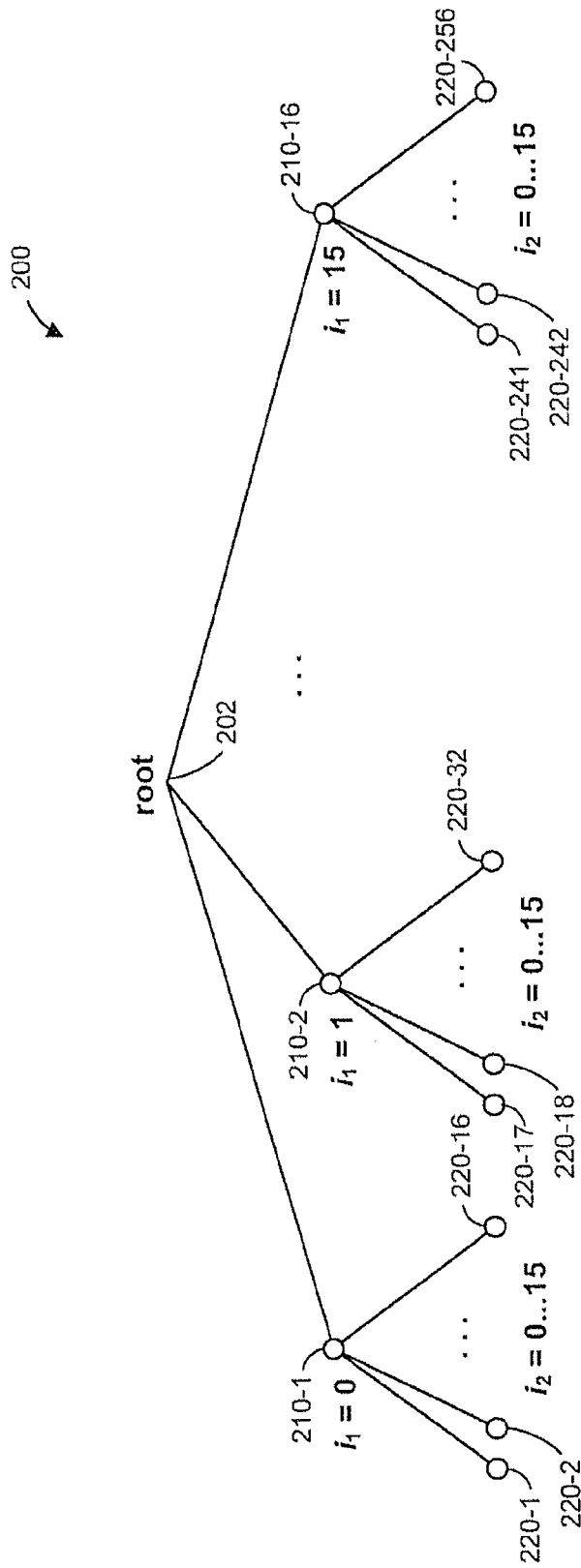
FIG. 4 is a diagram of an example decision tree utilized to efficiently search for a precoder in an LTE Release 10 wireless communication system, according to an embodiment.

FIG. 4 is a diagram of an example decision tree 200 utilized to efficiently search for a precoder in an LTE Release 10 wireless communication system, according to an embodiment. In various embodiments, the decision tree 200 is utilized by the receiver 120 of FIG. 2 or the receiver 160 of FIG. 3 (e.g., in some embodiments where an indicator of a selected precoder W is fed back from a receiver to a transmitter), or is utilized by the transmitter 110 of FIG. 2 or the transmitter 152 of FIG. 3 (e.g., in some embodiments where the transmitter estimates the forward channel based on signals received from a receiver via the reverse channel, and selects a precoder W for the forward channel based on the estimated channel information). More specifically, in same embodiments, the decision tree 200 is utilized by the network interface 184 (e.g., precoder selection unit 196) in receiver 160, or by the network interface 166 (e.g., receive baseband processing unit 176) in transmitter 152 of FIG. 3.

The arrangement of decision tree 200 takes advantage of structure that is inherent to the LTE Release 10 codebook for eight channel state information reference signal (CSI-RS) ports. With eight CSI-RS ports, each LTE Release 10 codebook entry corresponds to a pair of indices, which are known as precoding matrix indicators (PMIs) $i_1$ and $i_2$. Together, $i_1$ and $i_2$ provide an index that uniquely identifies a precoder in the LTE Release 10 codebook. The PMI $i_1$ corresponds to wideband (in frequency), long-term (in time) properties of the indexed precoder, while the PMI $i_2$ corresponds to narrowband (in frequency), short-term (in time) properties of the precoder. LTE Release 10 supports eight different layers/ranks (i.e., rank 1 through rank 8), with each layer/rank corresponding to the number of different data streams that are sent through transmit antennas in a spatial multiplexing operation. LTE Release 10 defines the following ranges of indices $i_1$ and $i_2$ for the different layers/ranks:

TABLE 1

| Index | Layer (Rank) | | | | | | | |
|---|---|---|---|---|---|---|---|---|
| | 1 | 2 | 3 | 4 | 5 | 6 | 7 | 8 |
| PMI $i_1$ | 0-15 | 0-15 | 0-3 | 0-3 | 0-3 | 0-3 | 0-3 | 0 |
| PMI $i_2$ | 0-15 | 0-15 | 0-15 | 0-7 | 0 | 0 | 0 | 0 |

As seen in Table 1, layers/ranks 1 and 2 correspond to 256 (16×16) total codebook entries, layer/rank 3 corresponds to 64 (4×16) total codebook entries, layer/rank 4 corresponds to 32 (4×8) total codebook entries, etc.

The example decision tree 200 corresponds to a rank 1 or rank 2 scenario with 16 $i_1$ values and 16 $i_2$ values, as shown in Table 1. In the decision tree 200, a root node 202 represents the start of the decision-making path (i.e., similar to root node 12 in decision tree 10 of FIG. 1). Connected as child nodes to root node 202 are 16 intermediate nodes 210-1 through 210-16. Connected as child nodes to each of the intermediate nodes 210 are 16 leaf nodes 220 (e.g., leaf nodes 220-1 through 220-16 connected to node 210-1, leaf nodes 220-17 through 220-32 connected to node 210-2, etc.).

In LTE Release 10, the codebook precoders that share the same $i_1$ are known to be relatively similar as compared to precoders that do not share the same $i_1$. For this reason, in the embodiment of FIG. 4, the codebook precoders indexed by the same $i_1$ are grouped together. That is, the codebook precoders indexed by the same $i_1$ are associated only with those nodes of leaf nodes 220 that share a same parent node 210. For example, the codebook precoders that LTE Release 10 defines as being indexed by $i_1=0$ (and any $i_2$ between 0 and 15) are associated with nodes 220-1 through 220-16 under parent node 210-1, and the codebook precoders that LTE Release 10 defines as being indexed by $i_1=1$ (and any $i_2$ between 0 and 15) are associated with nodes 220-17 through 220-32 under parent node 210-2, etc. In this manner, the decision tree 200 takes advantage of the inherent structure/properties of the LTE Release 10 codebook.

In the embodiment of FIG. 4, each of the leaf nodes 220 is associated with the LTE Release 10 codebook entry that is indexed by the $i_1$, $i_2$ value corresponding to that leaf node (i.e., the $i_1=0$, $i_2=0$ codebook entry for leaf node 220-1, the $i_1=0$, $i_2=1$ codebook entry for leaf node 220-2, etc., up until the $i_1=15$, $i_2=15$ codebook entry for leaf node 220-256). In addition, in an embodiment, each of the intermediate nodes 210 is associated with a precoder that in some way represents the group of respective leaf nodes 220 that are connected as child nodes. The relation between the precoders associated with nodes 210 and the codebook precoders associated with leaf nodes 220-1 through 220-256 is discussed further below with reference to specific example embodiments.

As noted above, when selecting a codebook precoder using decision tree 200, the decision path begins at root 202 and proceeds downward. First, each of the 16 nodes 210-1 through 210-16 is evaluated by calculating certain performance metrics (e.g., SINR, throughput, packet error rate, capacity, etc.) based on the precoder(s) associated with the respective node 210. Based on these calculated metrics, a "best" node of the nodes 210 is selected (e.g., a node for which the associated precoder(s) provide(s) a highest SINR, throughput, etc.). As seen in FIG. 4, the selected one of nodes 210-1 through 210-16 will correspond to a particular $i_1$ value (e.g., $i_1=0$ for node 210-1, $i_1=1$ for node 210-2, etc.). After one of nodes 210 (and, therefore, an $i_1$ value) is selected, all of the leaf nodes 220 that are child nodes to the selected one of nodes 210 are evaluated. Similar to the first decision stage, in an embodiment, each of the remaining candidate leaf nodes 220 is evaluated by calculating certain performance metrics based on the codebook precoders associated with those leaf nodes 220, and a "best" node of those remaining leaf nodes 220 is selected based on the calculated metrics. Techniques for calculating performance metrics and selecting a "best" node, both at the level of intermediate nodes 210 and at the level of leaf nodes 220, are discussed in more detail below with reference to specific example embodiments.

As seen in FIG. 4, the selected leaf node 220 will correspond to a particular $i_2$ value. Moreover, the combination of the selected leaf node 220 and its parent node 210 will corresponds to a particular $i_1$, $i_2$ value, which in turn allows a single precoder within the LTE Release 10 codebook to be uniquely determined. Notably, the decision tree 200 of FIG. 4 allows a codebook precoder to be selected after evaluating the precoders of only 32 (16+16) nodes, rather than evaluating all 256 (16×16) codebook precoders per the conventional approach. As a result, computational complexity and/or searching time may be greatly reduced. Moreover, and despite the potential for large gains in efficiency, performance (e.g., throughput) may be only slightly, or even negligibly, degraded as compared to an exhaustive precoder search.

In some embodiments, other decision trees are used for other scenarios in which an LTE Release 10 system utilizes a rank greater than rank 2. In one embodiment and scenario, for example, a rank 3 scenario corresponds to a decision tree in which a root node connects to four child nodes (corresponding to the four $i_1$ values for rank 3 in Table 1), and in which each of the four child nodes connects to sixteen leaf nodes (corresponding to the 16 $i_2$ values for rank 3 in Table 1), with each leaf node being associated with a different codebook precoder.

As noted above, and referring again to the rank 1 or rank 2 example of FIG. 4, each of intermediate nodes 210-1 through 210-16 is associated with a different precoder (or a different set of precoders), which is used during the selection process to evaluate the respective node using a performance metric, in an embodiment. In some embodiments, the performance metric used to evaluate a particular intermediate node 210 is a function of (1) the channel (e.g., estimated channel matrix H), (2) signal-to-noise ratio (SNR) for the channel, (3) the 16 precoders $W(i_1, i_2)$ corresponding to the value of $i_1$ associated with that particular node 210, and (4) a codebook subset restriction $\Omega_2$ (if any such restriction exists) on $i_2$. This metric can be represented as:

$$\text{metric}(i_{\downarrow}1) = f(H, \text{SNR}, W(i_{\downarrow}1, i_{\downarrow}2), i_{\downarrow}2 \in \Omega_{\downarrow}z) \quad \text{(Equation 2)}$$

According to various different embodiments, the function $f$ of Equation 2 is a function for determining capacity, throughput, packet error rate, or any other suitable performance metric.

In one embodiment, the metric for each intermediate node 210 (i.e., for each $i_1$) is averaged over all allowable $i_2$ values as:

$$\text{metric}(i_1) = \frac{1}{|\Omega_2|} \sum_{i_2 \in \Omega_2} f(H, \text{SNR}, W(i_1, i_2)) \quad \text{(Equation 3)}$$

In other embodiments, the metric for each intermediate node 210 is calculated using a single, fixed precoder. In one embodiment, for example, the metric is calculated as:

$$\text{metric}(i_{\downarrow}1) = f(H, \text{SNR}, P(i_{\downarrow}1, \Omega_{\downarrow}z)) \quad \text{(Equation 4)}$$

In some embodiments, $P(i_1, \Omega_2)$ denotes a precoder that is a function of all of the unrestricted codebook precoders (inside the set of $\Omega_2$) corresponding to the $i_1$ value under consideration. In one embodiment, for example, $P(i_1, \Omega_2)$ is a spatial centroid of all of the unrestricted codebook precoders $W(i_1, i_2)$ that correspond to the $i_1$ value under consideration.

In some embodiments, the codebook precoders $W(i_1, i_2)$ corresponding to the various leaf nodes 220 are of the form $$W = \begin{bmatrix} v \\ \phi v \end{bmatrix}, \quad \text{(Equation 5)}$$

where $v$ is a vector and $\phi$ is a scalar. In one embodiment where the codebook precoders conform to Equation 5, the precoders associated with intermediate nodes 210 contain two parts as follows:

$$P(i_1, \Omega_2) = (v_{fix}, \phi_{fix}) \quad \text{(Equation 6)}$$

In Equation 6, $v_{fix}$ is determined based on all of the available/unrestricted vectors $v$ used in the codebook precoders (per Equation 5), and $\phi_{fix}$ is a scalar determined based on all available/unrestricted scalars $\phi$ used in the codebook precoders (per Equation 5).

Specific example embodiments in which the intermediate nodes 210 are associated with spatial centroid precoders will now be described for the rank 2 scenario of Table 1, and then for the rank 1 scenario of Table 1. In the rank 2 scenario, in one embodiment, the precoder associated with a particular $i_1$ and intermediate node 210, $P(i_1, \Omega_2)$, is equal to the two dominant singular vectors of a matrix composed of all possible codebook precoders, $W(i_1) = [W(i_1, k_1), \ldots, W(i_1, k_{|\Omega2|})]$, where $\Omega_2 = \{k_1, \ldots, k_{|\Omega2|}\}$ denotes the codebook subset restriction on PMI $i_2$. In an embodiment, the two dominant singular vectors are determined first by taking the singular value decomposition of $W(i_1)$ as follows:

$$W(i_1) = U(i_1) \Sigma V(i_1)^H, \quad \text{(Equation 7)}$$

Where $A^H$ denotes the Hermitian transpose of the matrix A. The precoder for the given value of $i_1$ (i.e., the $P(i_1, \Omega_2)$ associated with the respective one of intermediate nodes 210) is equal, in this embodiment, to the first two columns of $U(i_1)$:

$$P(i_1, \Omega_2) = U(i_1)_{1:2} \quad \text{(Equation 8)}$$

In an alternative embodiment for the rank 2 scenario, $P(i_1, \Omega_2)$ is instead equal to a codebook precoder that corresponds to a fixed $i_2$ (denoted herein as $i_{2,fix}$):

$$P(i_1, \Omega_2) = W(i_1, i_{2,fix}) \quad \text{(Equation 9)}$$

In one embodiment where $i_2$ is subject to a codebook subset restriction $\Omega_2$, $i_{2,fix}$ is chosen to minimize the chordal distance to the subspace spanned by the active/unrestricted precoders:

$$i_{2,fix} = \underset{1 \le k \le 16}{\arg\min} \left\| W(i_1, k) W(i_1, k)^H - \sum_{i_2 \in \Omega_2} W(i_1, i_2) W(i_1, i_2)^H \right\| \quad \text{(Equation 10)}$$

In one such embodiment, and where all precoders are active in an LTE Release 10 system, $i_{2,fix}$ is equal to 12. In alternative embodiments, other suitable, distance-based metrics (e.g., Fubini-Study distance, projection two-norm distance, etc.) are used to determine the $i_2$ value that will be used as $i_{2,fix}$.

In the rank 1 scenario, in one embodiment, the precoder associated with a particular $i_1$ and intermediate node 210, $P(i_1, \Omega_2)$, is equal to the dominant singular vector of a matrix composed of all possible codebook precoders, $W(i_1) = [W(i_1, k_1), \ldots, W(i_1, k_{|\Omega2|})]^{1:4}$ (i.e., the first four rows of the matrix $[W(i_1, k_1), \ldots, W(i_1, k_{|\Omega2|})]$). In an embodiment, the dominant singular vector is determined first by taking the singular value decomposition of $W(i_1)$ according to Equation 7 above. The precoder for the given value of $i_1$ (i.e., the $P(i_1, \Omega_2)$ associated with the respective one of intermediate nodes 210) is then equal, in this embodiment, to the first column of $U(i_1)$:

$$P(i_1, \Omega_2) = U(i_1)_{1:1} \quad \text{(Equation 11)}$$

In an alternative embodiment for the rank 1 scenario, the precoder for a given value of (i.e., $P(i_1, \Omega_2)$) is equal to a codebook precoder corresponding to a fixed $i_2$ (e.g., an $i_{2,fix}$, that minimizes a chordal distance), and a fixed phase $\phi_{fix}$. In one embodiment where the codebook precoders have the form $$W = \begin{bmatrix} v \\ \phi v \end{bmatrix},$$

for example, $i_{2,fix}$ is chosen to minimize the chordal distance according to the formula $$i_{2,fix} = \underset{k=1,5,9,13}{\arg\min} \left\| v(i_1, k) v(i_1, k)^H - \sum_{i_2 \in \Omega_2} v(i_1, i_2) v(i_1, i_2)^H \right\| \quad \text{(Equation 12)}$$

where $\phi_{fix}$ is chosen according to the formula:

$$\phi_{fix} = \frac{1}{|\Omega_2|} \sum_{i_2 \in \Omega_2} \phi_{i_2} \quad \text{(Equation 13)}$$

In an embodiment, the precoder for each $i_1$ (i.e., for each intermediate node 210) is then set according to the formula:

$$P(i_1, \Omega_Z) = (v(i_1, i_{2,fix}), \phi_{fix}) \quad \text{(Equation 14)}$$

In other embodiments, other suitable distance metrics (e.g., Fubini-Study distance, projection two-norm distance, etc.) are utilized for the rank 1 scenario.

As noted above, various different performance metrics are utilized in order to evaluate intermediate nodes 210 and leaf nodes 220 in different embodiments. In one embodiment, a PMI $i_1$ (i.e., a particular one of intermediate nodes 210-1 through 210-16) is selected based on the sum capacity across all sub-bands (e.g., all frequency sub-bands in the wireless channel 116 of FIG. 2, or all frequency sub-bands in the wireless channel 156 of FIG. 3, etc.). First, in this embodiment, each intermediate node 210 is evaluated by using the associated precoder $P(i_1, \Omega_1)$ to calculate a capacity C at each sub-band k according to:

$$C(k,i_1) = \log_2(1 + SINR(H(k), P(i_1, \Omega_2)))$$ (Equation 15)

In Equation 15, k denotes the index of the frequency sub-band within the wireless channel, and H(k) is the estimated channel matrix corresponding to the sub-band k. Once the capacity C has been calculated for all values of k (e.g., all sub-bands in the wireless channel) and a given $i_1$ (i.e., the $i_1$ corresponding to the intermediate node 210 that is under consideration), the sum of the capacities for all sub-bands k is determined, in an embodiment. Thereafter, in this embodiment, the $i_1$ value that corresponds to the largest sum capacity is selected (i.e., the intermediate node 210 corresponding to the $i_1$ value that maximizes the sum capacity is selected):

$$i_{1,opt} = \underset{i_1}{\operatorname{argmax}} \sum_{k=1}^{K} C(k, i_1),$$ (Equation 16)

where K denotes the number of sub-bands. Once the intermediate node 210 corresponding to $i_{1,opt}$ is selected, an $i_2$ value is selected from among all of the entries associated with the selected $i_1$ (i.e., a leaf node 220 is selected from among all the leaf nodes 220 that are child nodes to the selected node 210). In one embodiment, for example, in the CSI reporting mode of PUSCH 3-1 in which all sub-bands share the same precoding matrix, the $i_2$ value that corresponds to the largest sum capacity is selected (i.e., the leaf node 220 corresponding to the $i_2$ value that maximizes the sum capacity is selected):

$$i_{2,opt} = \underset{i_2}{\operatorname{argmax}} \sum_{k=1}^{K} \log_2(1 + SINR(H(k), W(i_{1,opt}, i_2)))$$ (Equation 17)

Figure 5:
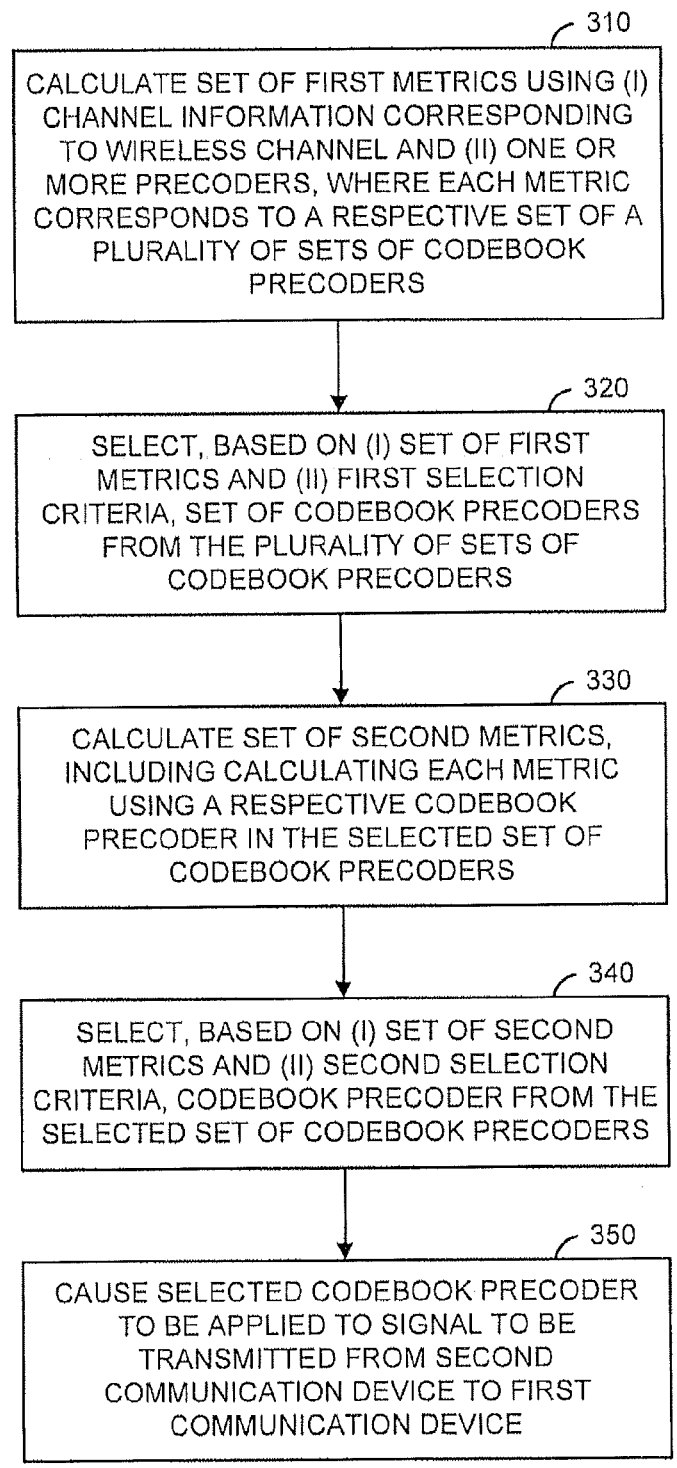
FIG. 5 is a flow diagram of an example method for efficiently selecting a precoder to be applied to a MIMO signal that is to be transmitted in a wireless communication system, according to an embodiment.

FIG. 5 is a flow diagram of an example method 300 for efficiently selecting a precoder to be applied to a MIMO signal that is to be transmitted in a wireless communication system, according to an embodiment. The communication system in which the method 300 is implemented includes a first communication device (e.g., a cellular handset device, WiFi-enabled laptop or smartphone, etc.) configured to receive precoded signals from a second communication device (e.g., a base station device, WiFi AP, etc.) via a wireless channel, and the method 300 is implemented within the first communication device and/or within the second communication device, according to different embodiments. In some embodiments, for example, the method 300 is implemented by the receiver 120 of FIG. 2 or the receiver 160 of FIG. 3 (e.g., in some embodiments where an indicator of a selected precoder W is fed back from the first communication device to the second communication device). In other embodiments, the method 300 is implemented by the transmitter 110 of FIG. 2 or the transmitter 152 of FIG. 3 (e.g., in some embodiments where the second communication device estimates the wireless channel based on signals received from the first communication device via a reverse wireless channel, and selects a precoder W for the wireless channel based on the estimated channel information). More specifically, in some embodiments, the method 300 is implemented by the network interface 184 (e.g., precoder selection unit 196) in receiver 160 of FIG. 3, or by the network interface 166 (e.g., receive baseband processing unit 176) in transmitter 152 of FIG. 3.

At block 310, a set of first metrics is calculated using (1) channel information corresponding to the wireless channel and (2) one or more precoders. Each metric in the set of first metrics corresponds to a respective set of a plurality of sets of codebook precoders. With reference to the embodiment of FIG. 1, for example, a first set of codebook precoders includes the two precoders associated with leaf nodes 40-1 and 40-2, a second set of codebook precoders includes the precoders associated with leaf nodes 40-3 and 40-4, etc. As another example, and referring to the embodiment of FIG. 4, a first set of codebook precoders includes the 16 precoders associated with leaf nodes 220-1 through 220-16, a second set of codebook precoders includes the 16 precoders associated with leaf nodes 220-17 through 220-32, etc. In an embodiment, the codebook precoders are arranged within the plurality of sets of codebook precoders (i.e., are grouped under common parent nodes in a particular manner) according to a vector distance-based grouping or clustering algorithm, or an iterative Lloyd algorithm, for example. In other embodiments, the codebook precoders are arranged/grouped according to some pre-existing structure of the codebook (e.g., as with the example embodiment of FIG. 4), or according to some other suitable heuristic.

In one embodiment, each metric in the set of first metrics is calculated at block 310 using (1) a channel matrix corresponding to the wireless channel (e.g., a channel matrix that is an estimate of the wireless channel), and (2) all of the codebook precoders included in the respective set of codebook precoders. With reference to FIGS. 1 and 2, for example, a metric associated with node 30-1 is, in this embodiment, calculated using (1) the estimated channel matrix H corresponding to the wireless channel 116 and (2) the codebook precoders associated with leaf nodes 40-1 and 40-2, and a metric associated with node 30-2 is calculated using (1) the estimated channel matrix H and (2) the codebook precoders associated with leaf nodes 40-3 and 40-4, etc.

In another embodiment, each metric in the set of first metrics is calculated using (1) a channel matrix corresponding to the wireless channel and (2) a single codebook precoder that is included in the respective set of codebook precoders. Referring again to FIGS. 1 and 2, for example, a metric associated with node 30-1 is, in this embodiment, calculated using (1) the estimated channel matrix H corresponding to the wireless channel 116 and (2) the codebook precoder associated with leaf node 40-1 or the codebook precoder associated with leaf node 40-2 (but not both), and a metric associated with node 30-2 is calculated using (1) the estimated channel matrix H and (2) the codebook precoders associated with leaf node 40-3 or the codebook precoder associated with leaf node 40-4 (but not both), etc.

In yet another embodiment, each metric in the set of first metrics is calculated using (1) a channel matrix corresponding to the wireless channel and (2) a precoder that is not included in the respective set of codebook precoders. In one embodiment, for example, the precoder used to calculate each metrics in the set of first metrics is a spatial "centroid" of all of the codebook precoders in the respective set of codebook precoders. Referring again to FIGS. 1 and 2, for example, a metric associated with node 30-1 is, in this embodiment, calculated using (1) the estimated channel matrix H corresponding to the wireless channel 116 and (2) a precoder that is a spatial centroid of the codebook precoders associated with leaf nodes 40-1 and 40-2, and a metric associated with node 30-2 is calculated using (1) the estimated channel matrix H and (2) a precoder that is a spatial centroid of the codebook precoders associated with leaf nodes 40-3 and 40-4, etc.

In some embodiments, the set of first metrics is calculated based on a channel matrix corresponding to the wireless channel, one or more precoders, and a channel quality metric such as SNR, SINR, achievable throughput, or capacity, for example. In some embodiments, for example, the set of first metrics is calculated using an equation similar to Equation 3 or Equation 4, above. In some embodiments, each metric in the set of first metrics is calculated over multiple sub-bands of the wireless channel. In one embodiment, for example, each metric in the set of first metrics is a sum capacity, similar to the sum capacity operated on by the arg max (x) function of Equation 16.

At block 320, a set of codebook precoders is selected from the plurality of sets of codebook precoders based on (1) the set of first metrics calculated at block 310 and (2) a first selection criteria. In the embodiment of FIG. 1, for example, the selection of the set of codebook precoders corresponds to the selection of one of the two intermediate nodes 30 that are still candidate nodes after having earlier selected one of intermediate nodes 20 (i.e., the selection of one of nodes 30-1 and 30-2 if node 20-1 was previously selected, or the selection of one of nodes 30-3 and 30-4 if node 20-2 was previously selected). As another example, in the embodiment of FIG. 4, the selection of the set of codebook precoders corresponds to the selection of one of the 16 intermediate nodes 210-1 through 210-16. In one embodiment where each metric in the set of first metrics calculated at block 310 is a sum capacity (e.g., the sum capacity operated on by the arg max (x) function of Equation 16), the first selection criteria is a largest sum capacity (e.g., the set of codebook precoders is selected to satisfy Equation 16).

In response to selecting the set of codebook precoders at block 320, the method 300 calculates a set of second metrics at block 330 and selects a codebook precoder at block 340. Each metric in the set of second metrics is calculated at block 330 using a respective codebook precoder in the set of codebook precoders selected at block 320. In one embodiment, each metric in the set of second metrics is calculated using (1) channel information corresponding to the wireless channel (e.g., a channel matrix that is an estimate of the wireless channel), and (2) the respective codebook precoder. With reference to FIGS. 1 and 2, for example, a metric associated with leaf node 40-1 is, in this embodiment, calculated using (1) channel information corresponding to the wireless channel 116 (e.g., the estimated channel matrix H) and (2) the codebook precoder associated with leaf node 40-1, and a metric associated with leaf node 40-2 is calculated using (1) channel information corresponding to the wireless channel 116 and (2) the codebook precoder associated with leaf node 40-2, etc. In some embodiments, each metric in the set of second metrics is calculated using (1) a channel matrix corresponding to the wireless channel, (2) a channel quality metric (e.g., SNR, SINR, achievable throughput, or capacity), and (3) the respective codebook precoder. In some embodiments, each metric in the set of second metrics is calculated over multiple sub-bands of the wireless channel. In one embodiment, for example, each metric in the set of second metrics is a sum capacity, similar to the sum capacity operated on by the arg max (x) function of Equation 17.

The codebook precoder selected at block 340 is a precoder from the set of codebook precoders that was selected at block 320. The selection of the codebook precoder is made based on (1) the set of second metrics calculated at block 330 and (2) a second selection criteria. In the embodiment of FIG. 1, for example, the selection of the codebook precoder corresponds to the selection of one of the two leaf nodes 40 that are still candidate nodes after having earlier selected (at block 320) one of intermediate nodes 30 (e.g., the selection of one of leaf nodes 40-1 and 40-2 if node 30-1 was previously selected, or the selection of one of leaf nodes 40-3 and 40-4 if node 30-2 was previously selected, etc.). As another example, in the embodiment of FIG. 4, the selection of the codebook precoder corresponds to the selection of one of the 16 leaf nodes that are still candidate nodes after having earlier selected one of intermediate nodes 210 (e.g., the selection of one of leaf nodes 220-1 through 220-16 if node 210-1 was previously selected, or the selection of one of leaf nodes 220-17 through 220-32 if node 210-2 was previously selected, etc.). In one embodiment where each metric in the set of second metrics calculated at block 330 is a sum capacity (e.g., the sum capacity operated on by the arg max (x) function of Equation 17), the second selection criteria is a largest sum capacity (e.g., the set of codebook precoders is selected to satisfy Equation 17).

At block 350, the codebook precoder selected at block 340 is caused to be applied to a signal (e.g., a MIMO signal) to be transmitted from the second communication device to the first communication device. In one embodiment (e.g., an embodiment in which the method 300 is implemented by a receiver device such as receiver 120 of FIG. 2 or receiver 160 of FIG. 3), the method 300 causes the selected codebook precoder to be applied to the signal by causing an indicator of the selected codebook precoder to be transmitted to the second communication device. In one embodiment, for example, the method 300 causes the selected codebook precoder to be applied to the signal by providing B index bits (e.g., eight bits for a codebook with 256 precoders) to a transmitter portion of the first communication device, which in turn transmits the B bits as feedback to the second communication device.

In another embodiment (e.g., an embodiment in which the method 300 is implemented by a transmitter device such as transmitter 110 of FIG. 2 or transmitter 152 of FIG. 3), the method 300 causes the selected codebook precoder to be applied to the signal by routing control information to baseband transmit circuitry, or by directly applying the selected codebook precoder to the signal.

In some embodiments, the method 300 includes additional blocks not shown in FIG. 5. In one embodiment, for example, the method 300 includes an additional block, prior to block 310, in which the wireless channel is estimated in order to determine the channel information corresponding to the wireless channel.

Further aspects of the present invention relate to one or more of the following clauses.

In one embodiment, a method is implementable by one or more processors in a communication system that includes a first communication device configured to receive precoded signals from a second communication device via a wireless channel. The method includes calculating, via the one or more processors, a set of first metrics using (i) channel information corresponding to the wireless channel, and (ii) one or more precoders. Each metric of the set of first metrics corresponds to a respective set of a plurality of sets of codebook precoders. The method also includes selecting, via the one or more processors and based on (i) the set of first metrics and (ii) a first selection criteria, a set of codebook precoders from the plurality of sets of codebook precoders. The method also includes, in response to selecting the set of codebook precoders, calculating, via the one or more processors, a set of second metrics and selecting, via the one or more processors and based on (i) the set of second metrics and (ii) a second selection criteria, a codebook precoder from the selected set of codebook precoders. Calculating a set of second metrics includes calculating each metric in the set of second metrics using a respective codebook precoder in the selected set of codebook precoders. The method also includes causing, via the one or more processors, the selected codebook precoder to be applied to a signal to be transmitted from the second communication device to the first communication device.

In some embodiments, the method includes one or more of the following features.

Causing the selected codebook precoder to be applied to the signal includes causing an indicator of the selected codebook precoder to be transmitted to the second communication device.

Calculating a set of first metrics includes calculating each metric in the set of first metrics using (i) a channel matrix corresponding to the wireless channel and (ii) all codebook precoders in the respective set of codebook precoders.

Calculating a set of first metrics includes calculating each metric in the set of first metrics using (i) a channel matrix corresponding to the wireless channel and (ii) a single codebook precoder in the respective set of codebook precoders.

Calculating a set of first metrics includes calculating each metric in the set of first metrics using (i) a channel matrix corresponding to the wireless channel and (ii) a precoder not included in the respective set of codebook precoders.

Calculating a set of first metrics includes calculating each metric in the set of first metrics using (i) the channel matrix corresponding to the wireless channel and (ii) a spatial centroid of all codebook precoders in the respective set of codebook precoders.

Calculating a set of first metrics includes calculating each metric in the set of first metrics using (i) a channel matrix corresponding to the wireless channel, (ii) a channel quality metric, and (iii) the one or more precoders.

Calculating a set of first metrics includes calculating each metric in the set of first metrics using (i) the channel matrix corresponding to the wireless channel, (ii) a signal-to-noise ratio, a signal-to-interference-plus-noise ratio, an achievable throughput, or a capacity, and (iii) the one or more precoders.

Calculating each metric in the set of second metrics includes calculating each metric in the set of second metrics using (i) channel information corresponding to the wireless channel and (ii) the respective codebook precoder.

Calculating each metric in the set of second metrics includes calculating each metric in the set of second metrics using (i) a channel matrix corresponding to the wireless channel, (ii) a channel quality metric, and (iii) the respective codebook precoder.

Calculating a set of first metrics includes calculating a first set of sum capacities, wherein each sum capacity in the first set of sum capacities is determined based on a plurality of respective capacities, and wherein each capacity in the plurality of respective capacities corresponds to a respective sub-band of a plurality of sub-bands in the wireless channel, and selecting a set of codebook precoders from the plurality of sets of codebook precoders based on a first selection criteria includes selecting a set of codebook precoders that corresponds to a largest sum capacity of the first set of sum capacities.

Calculating a set of second metrics includes calculating a second set of sum capacities, wherein each sum capacity in the second set of sum capacities is determined based on a plurality of respective capacities, and wherein each capacity in the plurality of respective capacities corresponds to a respective sub-band of the plurality of sub-bands in the wireless channel, and selecting a codebook precoder from the selected set of codebook precoders based on a second selection criteria includes selecting a codebook precoder that corresponds to a largest sum capacity of the second set of sum capacities.

An arrangement of codebook precoders within the plurality of sets of codebook precoders is in accordance with at least one of (i) a vector distance-based grouping or clustering algorithm, or (ii) an iterative Lloyd algorithm.

Estimating, via the one or more processors, the wireless channel to determine the channel information corresponding to the wireless channel.

In another embodiment, a first communication device is configured to receive precoded signals from a second communication device via a wireless channel. The first communication device includes a network interface configured to calculate a set of first metrics using (i) channel information corresponding to the wireless channel and (ii) one or more precoders, wherein each metric of the set of first metrics corresponds to a respective set of a plurality of sets of codebook precoders. The first communication device also selects, based on (i) the set of first metrics and (ii) a first selection criteria, a set of codebook precoders from the plurality of sets of codebook precoders. The first communication device also, in response to selecting the set of codebook precoders, calculates a set of second metrics at least by calculating each metric in the set of second metrics using a respective codebook precoder in the selected set of codebook precoders, and selects, based on (i) the set of second metrics and (ii) a second selection criteria, a codebook precoder from the selected set of codebook precoders. The first communication device also causes an indicator of the selected codebook precoder to be transmitted to the second communication device.

In some embodiments, the first communication device includes one or more of the following features.

The network interface is configured to calculate the set of first metrics at least by calculating each metric in the set of first metrics using a channel matrix corresponding to the wireless channel, and either (i) all codebook precoders in the respective set of codebook precoders, (ii) a single codebook precoder in the respective set of codebook precoders, or (iii) a spatial "centroid" of all codebook precoders in the respective set of codebook precoders, and is configured to calculate each metric in the set of second metrics using the channel matrix corresponding to the wireless channel, and the respective codebook precoder.

The network interface is configured to calculate the set of first metrics at least by calculating each metric in the set of first metrics using (i) a channel matrix corresponding to the wireless channel, (ii) a channel quality metric, and (iii) the one or more precoders, and is configured to calculate each metric in the set of second metrics using (i) a channel matrix corresponding to the wireless channel, (ii) a channel quality metric, and (iii) the respective codebook precoder.

The network interface is configured to calculate a set of first metrics at least by calculating a first set of sum capacities, wherein each sum capacity in the first set of sum capacities is determined based on a plurality of respective capacities, and wherein each capacity in the plurality of respective capacities corresponds to a respective sub-band of a plurality of sub-bands in the wireless channel, is configured to select a set of codebook precoders from the plurality of sets of codebook precoders at least by selecting a set of codebook precoders that corresponds to a largest sum capacity of the first set of sum capacities, is configured to calculate a set of second metrics at least by calculating a second set of sum capacities, wherein each sum capacity in the second set of sum capacities is determined based on a plurality of respective capacities, and wherein each capacity in the plurality of respective capacities corresponds to a respective sub-band of the plurality of sub-bands in the wireless channel, and is configured to select a codebook precoder from the selected set of codebook precoders at least by selecting a codebook precoder that corresponds to a largest sum capacity of the second set of sum capacities.

In another embodiment, a tangible, non-transitory computer-readable medium stores instructions that, when executed by one or more processors, cause the one or more processors to calculate a set of first metrics using (i) channel information corresponding to a wireless channel, wherein the wireless channel is utilized to send precoded signals to a first communication device from a second communication device, and (ii) one or more precoders. Each metric of the set of first metrics corresponds to a respective set of a plurality of sets of codebook precoders. The instructions also cause the one or more processors to select, based on (i) the set of first metrics and (ii) a first selection criteria, a set of codebook precoders from the plurality of sets of codebook precoders. The instructions also cause the one or more processors to, in response to selecting the set of codebook precoders, calculate a set of second metrics at least by calculating each metric in the set of second metrics using a respective codebook precoder in the selected set of codebook precoders, and to select, based on (i) the set of second metrics and (ii) a second selection criteria, a codebook precoder from the selected set of codebook precoders. The instructions also cause the one or more processors to cause the selected codebook precoder to be applied to a signal to be transmitted from the second communication device to the first communication device.

In some embodiments, the tangible, non-transitory computer-readable medium includes one or more of the following features.

The instructions cause the one or more processors to cause the selected codebook precoder to be applied to the signal at least by causing an indicator of the selected codebook precoder to be transmitted to the second communication device.

The instructions cause the one or more processors to calculate the set of first metrics at least by calculating each metric in the set of first metrics using a channel matrix corresponding to the wireless channel, and either (i) all codebook precoders in the respective set of codebook precoders, (ii) a single codebook precoder in the respective set of codebook precoders, or (iii) a spatial "centroid" of all codebook precoders in the respective set of codebook precoders, and to calculate each metric in the set of second metrics using the channel matrix corresponding to the wireless channel, and the respective codebook precoder.

The instructions cause the one or more processors to calculate the set of first metrics at least by calculating each metric in the set of first metrics using (i) a channel matrix corresponding to the Wireless channel, (ii) a channel quality metric, and (iii) the one or more precoders, and to calculate each metric in the set of second metrics using (i) a channel matrix corresponding to the wireless channel, (ii) a channel quality metric, and (iii) the respective codebook precoder.

The instructions cause the one or more processors to calculate a set of first metrics at least by calculating a first set of sum capacities, wherein each sum capacity in the first set of sum capacities is determined based on a plurality of respective capacities, and wherein each capacity in the plurality of respective capacities corresponds to a respective sub-band of a plurality of sub-bands in the wireless channel, to select a set of codebook precoders from the plurality of sets of codebook precoders at least by selecting a set of codebook precoders that corresponds to a largest sum capacity of the first set of sum capacities, to calculate a set of second metrics at least by calculating a second set of sum capacities, wherein each sum capacity in the second set of sum capacities is determined based on a plurality of respective capacities, and wherein each capacity in the plurality of respective capacities corresponds to a respective sub-band of the plurality of sub-bands in the wireless channel, and to select a codebook precoder from the selected set of codebook precoders at least by selecting a codebook precoder that corresponds to a largest sum capacity of the second set of sum capacities.

At least some of the various blocks, operations, and techniques described above may be implemented utilizing hardware, one or more processors executing firmware instructions, one or more processors executing software instructions, or any combination thereof. When implemented utilizing one or more processors executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the one or more processors, cause the one or more processors to perform various acts.

When implemented in hardware, the hardware may comprise one or more of discrete components, an integrated circuit, an ASIC, etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, implementable by one or more processors in a communication system, wherein the communication system includes a first communication device configured to receive precoded signals from a second communication device via a wireless channel, the method comprising:
    calculating, via the one or more processors, a set of first metrics using (i) channel information corresponding to the wireless channel, and (ii) one or more precoders, wherein each metric of the set of first metrics corresponds to a respective set of a plurality of sets of codebook precoders, wherein each set includes a same number of precoders;
    selecting, via the one or more processors and based on (i) the set of first metrics and (ii) a first selection criteria, a set of codebook precoders from the plurality of sets of codebook precoders;
    in response to selecting the set of codebook precoders,
        calculating, via the one or more processors, a set of second metrics, wherein calculating the set of second metrics includes calculating each metric in the set of second metrics using a respective codebook precoder in the selected set of codebook precoders, and
        selecting, via the one or more processors and based on (i) the set of second metrics and (ii) a second selection criteria, a codebook precoder from the selected set of codebook precoders; and
    causing, via the one or more processors, the selected codebook precoder to be applied to a signal to be transmitted from the second communication device to the first communication device.

2. The method of claim 1, wherein causing the selected codebook precoder to be applied to the signal includes causing an indicator of the selected codebook precoder to be transmitted to the second communication device.

3. The method of claim 1, wherein calculating the set of first metrics includes calculating each metric in the set of first metrics using (i) a channel matrix corresponding to the wireless channel and (ii) all codebook precoders in the respective set of codebook precoders.

4. The method of claim 1, wherein calculating the set of first metrics includes calculating each metric in the set of first metrics using (i) a channel matrix corresponding to the wireless channel and (ii) a single codebook precoder in the respective set of codebook precoders.

5. The method of claim 1, wherein calculating the set of first metrics includes calculating each metric in the set of first metrics using (i) a channel matrix corresponding to the wireless channel and (ii) a precoder not included in the respective set of codebook precoders.

6. The method of claim 1, wherein calculating the set of first metrics includes calculating each metric in the set of first metrics using (i) a channel matrix corresponding to the wireless channel and (ii) a spatial centroid of all codebook precoders in the respective set of codebook precoders.

7. The method of claim 1, wherein calculating the set of first metrics includes calculating each metric in the set of first metrics using (i) a channel matrix corresponding to the wireless channel, (ii) a channel quality metric, and (iii) the one or more precoders.

8. The method of claim 7, wherein calculating the set of first metrics includes calculating each metric in the set of first metrics using (i) the channel matrix corresponding to the wireless channel, (ii) a signal-to-noise ratio, a signal-to-interference-plus-noise ratio, an achievable throughput, or a capacity, and (iii) the one or more precoders.

9. The method of claim 1, wherein calculating each metric in the set of second metrics includes calculating each metric in the set of second metrics using (i) channel information corresponding to the wireless channel and (ii) the respective codebook precoder.

10. The method of claim 9, wherein calculating each metric in the set of second metrics includes calculating each metric in the set of second metrics using (i) a channel matrix corresponding to the wireless channel, (ii) a channel quality metric, and (iii) the respective codebook precoder.

11. The method of claim 1, wherein:
    calculating the set of first metrics includes calculating a first set of sum capacities, wherein each sum capacity in the first set of sum capacities is determined based on a first plurality of respective capacities, and wherein each capacity in the first plurality of respective capacities corresponds to a respective sub-band of a plurality of sub-bands in the wireless channel; and
    selecting the set of codebook precoders from the plurality of sets of codebook precoders based on the first selection criteria includes selecting a set of codebook precoders that corresponds to a largest sum capacity of the first set of sum capacities.

12. The method of claim 11, wherein:
    calculating the set of second metrics includes calculating a second set of sum capacities, wherein each sum capacity in the second set of sum capacities is determined based on a second plurality of respective capacities, and wherein each capacity in the second plurality of respective capacities corresponds to a respective sub-band of the plurality of sub-bands in the wireless channel; and
    selecting the codebook precoder from the selected set of codebook precoders based on the second selection criteria includes selecting a codebook precoder that corresponds to a largest sum capacity of the second set of sum capacities.

13. The method of claim 1, wherein:
    an arrangement of codebook precoders within the plurality of sets of codebook precoders is in accordance with at least one of (i) a vector distance-based grouping or clustering algorithm, or (ii) an iterative Lloyd algorithm.

14. The method of claim 1, further comprising:
    estimating, via the one or more processors, the wireless channel to determine the channel information corresponding to the wireless channel.

15. A first communication device configured to receive precoded signals from a second communication device via a wireless channel, the first communication device comprising:
    a network interface having one or more integrated circuits configured to
        calculate a set of first metrics using (i) channel information corresponding to the wireless channel and (ii) one or more precoders, wherein each metric of the set of first metrics corresponds to a respective set of a plurality of sets of codebook precoders, wherein
each set includes a same number of precoders,
select, based on (i) the set of first metrics and (ii) a first
selection criteria, a set of codebook precoders from
the plurality of sets of codebook precoders,
in response to selecting the set of codebook precoders,
calculate a set of second metrics at least by calculating each metric in the set of second metrics
using a respective codebook precoder in the
selected set of codebook precoders, and
select, based on (i) the set of second metrics and (ii)
a second selection criteria, a codebook precoder
from the selected set of codebook precoders, and
cause an indicator of the selected codebook precoder to
be transmitted to the second communication device.

16. The first communication device of claim 15, wherein the one or more integrated circuits are configured to:
calculate the set of first metrics at least by calculating each
metric in the set of first metrics using
a channel matrix corresponding to the wireless channel, and
either (i) all codebook precoders in the respective set of
codebook precoders, (ii) a single codebook precoder
in the respective set of codebook precoders, or (iii)
a spatial "centroid" of all codebook precoders in the
respective set of codebook precoders; and
calculate each metric in the set of second metrics using
the channel matrix corresponding to the wireless channel, and
the respective codebook precoder.

17. The first communication device of claim 15, wherein the one or more integrated circuits are configured to:
calculate the set of first metrics at least by calculating each
metric in the set of first metrics using (i) a channel
matrix corresponding to the wireless channel, (ii) a first
channel quality metric, and (iii) the one or more precoders; and
calculate each metric in the set of second metrics using (i)
the channel matrix corresponding to the wireless channel, (ii) a second channel quality metric, and (iii) the
respective codebook precoder.

18. The first communication device of claim 15, wherein the one or more integrated circuits are configured to:
calculate the set of first metrics at least by calculating a
first set of sum capacities, wherein each sum capacity
in the first set of sum capacities is determined based on
a first plurality of respective capacities, and wherein
each capacity in the first plurality of respective capacities corresponds to a respective sub-band of a plurality
of sub-bands in the wireless channel;
select the set of codebook precoders from the plurality of
sets of codebook precoders at least by selecting a set of
codebook precoders that corresponds to a largest sum
capacity of the first set of sum capacities;
calculate the set of second metrics at least by calculating
a second set of sum capacities, wherein each sum
capacity in the second set of sum capacities is determined based on a second plurality of respective capacities, and wherein each capacity in the second first
plurality of respective capacities corresponds to a
respective sub-band of the plurality of sub-bands in the
wireless channel; and
select the codebook precoder from the selected set of
codebook precoders at least by selecting a codebook
precoder that corresponds to a largest sum capacity of
the second set of sum capacities.

19. A tangible, non-transitory computer-readable medium storing instructions that, when executed by one or more processors, cause the one or more processors to:
calculate a set of first metrics using (i) channel information corresponding to a wireless channel, wherein the
wireless channel is utilized to send precoded signals to
a first communication device from a second communication device, and (ii) one or more precoders,
wherein each metric of the set of first metrics corresponds to a respective set of a plurality of sets of
codebook precoders, wherein each set includes a same
number of precoders;
select, based on (i) the set of first metrics and (ii) a first
selection criteria, a set of codebook precoders from the
plurality of sets of codebook precoders;
in response to selecting the set of codebook precoders,
calculate a set of second metrics at least by calculating
each metric in the set of second metrics using a
respective codebook precoder in the selected set of
codebook precoders, and
select, based on (i) the set of second metrics and (ii) a
second selection criteria, a codebook precoder from
the selected set of codebook precoders; and
cause the selected codebook precoder to be applied to a
signal to be transmitted from the second communication device to the first communication device.

20. The tangible, non-transitory computer-readable medium of claim 19, wherein the instructions cause the one or more processors to cause the selected codebook precoder to be applied to the signal at least by causing an indicator of the selected codebook precoder to be transmitted to the second communication device.

21. The tangible, non-transitory computer-readable medium of claim 19, wherein the instructions cause the one or more processors to:
calculate the set of first metrics at least by calculating each
metric in the set of first metrics using
a channel matrix corresponding to the wireless channel, and
either (i) all codebook precoders in the respective set of
codebook precoders, (ii) a single codebook precoder
in the respective set of codebook precoders, or (iii)
a spatial "centroid" of all codebook precoders in the
respective set of codebook precoders; and
calculate each metric in the set of second metrics using
the channel matrix corresponding to the wireless channel, and
the respective codebook precoder.

22. The tangible, non-transitory computer-readable medium of claim 19, wherein the instructions cause the one or more processors to:
calculate the set of first metrics at least by calculating each
metric in the set of first metrics using (i) a channel
matrix corresponding to the wireless channel, (ii) a first
channel quality metric, and (iii) the one or more precoders; and
calculate each metric in the set of second metrics using (i)
the channel matrix corresponding to the wireless channel, (ii) a second channel quality metric, and (iii) the
respective codebook precoder.

23. The tangible, non-transitory computer-readable medium of claim 19, wherein the instructions cause the one or more processors to:
calculate the set of first metrics at least by calculating a
first set of sum capacities, wherein each sum capacity
in the first set of sum capacities is determined based on
a first plurality of respective capacities, and wherein each capacity in the first plurality of respective capacities corresponds to a respective sub-band of a plurality of sub-bands in the wireless channel;

select the set of codebook precoders from the plurality of sets of codebook precoders at least by selecting a set of codebook precoders that corresponds to a largest sum capacity of the first set of sum capacities;

calculate the set of second metrics at least by calculating a second set of sum capacities, wherein each sum capacity in the second set of sum capacities is determined based on a second plurality of respective capacities, and wherein each capacity in the second plurality of respective capacities corresponds to a respective sub-band of the plurality of sub-bands in the wireless channel; and select the codebook precoder from the selected set of codebook precoders at least by selecting a codebook precoder that corresponds to a largest sum capacity of the second set of sum capacities.

* * * * *